(12) United States Patent
Healey

(10) Patent No.: US 6,558,503 B1
(45) Date of Patent: May 6, 2003

(54) METHOD OF PRODUCING A JOINT

(75) Inventor: Michael J Healey, Bradley Stoke (GB)

(73) Assignee: BAE Systems plc, Farnborough (GB)

( * ) Notice: Subject to any disclaimer, the term of this patent is extended or adjusted under 35 U.S.C. 154(b) by 57 days.

(21) Appl. No.: 09/673,843

(22) PCT Filed: Sep. 5, 2000

(86) PCT No.: PCT/GB00/03388

§ 371 (c)(1),
(2), (4) Date: Oct. 23, 2000

(87) PCT Pub. No.: WO01/19936

PCT Pub. Date: Mar. 22, 2001

(30) Foreign Application Priority Data

Sep. 16, 1999 (GB) .................................... 9921784

(51) Int. Cl.⁷ .............................. C09J 5/00; B29C 65/54
(52) U.S. Cl. ...................................... 156/307.3; 244/131
(58) Field of Search ............... 156/87, 107, 307.3; 244/131

(56) References Cited

U.S. PATENT DOCUMENTS

| | | |
|---|---|---|
| 3,894,024 A | 7/1975 | Cherenko et al. |
| 4,015,035 A | 3/1977 | Blad et al. |
| 4,299,639 A * | 11/1981 | Bayer .................. 156/104 |
| 4,395,450 A * | 7/1983 | Whitener ............... 156/201 |
| 4,630,846 A | 12/1986 | Nishino et al. |
| 4,634,140 A | 1/1987 | Stroi |
| 4,655,473 A | 4/1987 | Müller et al. |
| 5,262,120 A | 11/1993 | Bretagne |
| 5,498,016 A | 3/1996 | Jodelet |
| 5,533,693 A * | 7/1996 | Abildskov ............ 139/384 R |
| 5,589,243 A | 12/1996 | Day |
| 5,670,109 A | 9/1997 | DeRees |
| 5,830,308 A * | 11/1998 | Reichard ................ 156/157 |

FOREIGN PATENT DOCUMENTS

| | | |
|---|---|---|
| DE | 1939955 | 2/1970 |
| DE | 2155146 | 5/1973 |
| DE | 26 35 641 | 2/1978 |
| FR | 1428344 | 1/1966 |
| FR | 1590442 | 5/1970 |
| GB | 1160506 | 8/1969 |
| GB | 1460461 | 1/1977 |
| GB | 2 279 294 A | 1/1995 |
| JP | 56-16605 | 12/1981 |
| JP | 60-6433 | 1/1985 |
| JP | 60-6434 | 1/1985 |
| JP | 61-91278 | 5/1986 |
| JP | 63-9046 | 1/1988 |
| JP | 1-204709 | 8/1989 |
| JP | 2-255781 | 10/1990 |

* cited by examiner

Primary Examiner—Michael W. Ball
Assistant Examiner—John T. Haran
(74) Attorney, Agent, or Firm—Nixon & Vanderhye P.C.

(57) ABSTRACT

The method comprises positioning two components adjacent each other so as to define a space between them, bridging edges of the space with webs and filling the space with flowable material such as adhesive. A fabric is preferably arranged in the space and is impregnated by the flowable material as it is drawn into the space.

21 Claims, 3 Drawing Sheets

METHOD OF PRODUCING A JOINT

BACKGROUND OF THE INVENTION

1. Field of the Invention

The invention relates to a method of producing a joint by introducing a flowable material such as a resin adhesive between components and is particularly, but not exclusively, concerned with a method of producing a joint using an adhesive, a sealant or a filler between aerospace components.

2. Discussion of Prior Art

Adhesive bonding for structural application uses film or paste adhesives.

Film adhesives are generally preferred for high performance applications and are easier to apply as they have little tack at ambient temperatures. They are however, more difficult to process as they need to be heated under pressure to achieve a bond. When using film adhesives the optimum glue-line thickness is approximately 0.2 mm.

Paste adhesives come in a variety of viscosities for different applications. One known process using a paste adhesive involves applying adhesive to the surfaces of the components to be joined and then, using a jig, bringing them together so as to form a sandwich, with the adhesive between them. The components must be brought together carefully to avoid entrapment of air in the adhesive between the components. Also, once together the components are difficult to adjust relative to each other due to the tacky thixotropic nature of the adhesive used and they need to be brought together accurately. The process is time consuming and is also messy and wastefull as adhesive extrudes from the sandwiched components as they are brought together. Due to the nature of the process, it is also labour intensive.

SUMMARY OF THE INVENTION

It is an object of the present invention to provide an improved method of bonding components.

According to an aspect of the invention there is provided a method of producing a joint, the method comprising positioning two components adjacent each other so as to define a space between them, bridging edges of the space with a sealing member and filling the space with flowable material such as a resin adhesive by suction.

The method of the invention is particularly straightforward and assemblies made with it can be manufactured slightly under design tolerance with the difference being taken up within the filled space. In addition, the method of the invention allows only one preparation, assembly and cure cycle to be used.

The use of the sealing member not only helps to keep the material in place at the edges of the space but may also control the profile of the material at the edges.

The sealing member may comprise a web, and is preferably retained in its bridging position using a fixing means such as an adhesive coating on a side of the sealing web. The web may instead be held in place by laying it against the components and painting over it with a sealant, for example PR 1875™, an adhesive or a varnish. In the present example, the sealing web is constructed from fabric tape, although it may be constructed of other suitable material. The fabric tape may be constructed of glass or carbon fibres.

The components may be positioned adjacent each other using a construction jig.

It is desirable to have inlets at a low level and outlets at a high level to avoid resin/adhesive voids and porosity.

Paste adhesives are often used where the tolerances of the parts to be bonded are low but, even so, glue-lines (i.e. the thickness of the glue or adhesive layer between the components) greater than 0.5 mm have not previously been recommended using this method.

In order to address the problems that can arise with low tolerance components, a fabric of appropriate thickness may be placed in the space between the components prior to the filling of the space with the flowable material. That arrangement helps considerably to provide a strong joint line where the glue line is of substantial thickness and will avoid the need to utilise a member known as a "shim" between the two components. The flowable material introduced impregnates the fabric. With the use of the fabric the finished component will be analogous to a continuous composite, albeit cured at different times.

The fibre volume fraction for the joint may be substantially 2–70%, although preferably it will be substantially 30–60%. The fabric may comprise a lay-up of fibres such that fibres of one layer are transverse to fibres of another layer. Preferably the fabric will have a +/–45 degree lay-up. This orientation is springy and its fabric structure allows easy resin infusion therethrough.

If it is necessary to separate the components of the joint after the formation thereof, a release substance can be applied to a surface of one of the components which defines the space. The substance may comprise any convenient type of sealant material or a release layer. This technique allows very large areas effectively to be "shimmed" at the same time as bonding with no maximum thickness contraints.

Resins with low shrinkage, low coeffient of thermal expansion (CTE) and high strains are preferred, to minimise stresses. If a fabric is used it will preferably match the CTE of the components and will help control the overall CTE and thus minimise stresses. For CFRP the fabric would normally be the same type of carbon, whereas for hybrids or metallic construction glass may be preferred especially to avoid any galvanic corrosion problems.

In a further embodiment, at least one of the components has projections thereon, and the method comprises positioning the components adjacent each other so as to define a space between them with the projections extending into the space, the flowable material surrounding the projections as it is introduced into the space.

According to a further aspect of the invention there is provided a method of producing a joint, the method comprising providing first and second components at least one of which has projections thereon, positioning the components adjacent each other so as to define a space between them with the projections extending into the space, and introducing a flowable material such as a resin adhesive into the space to surround the projections.

One of the components may have the projections thereon, although both the components may have projections. Where both components have projections it is preferable that the projections on one component interdigitate with the projections on the other component.

BRIEF DESCRIPTION OF THE DRAWINGS

A method in accordance with the above aspects of the invention will now be described in detail, by way of example, and with reference to the accompanying drawings in which.

DETAILED DISCUSSION OF EMBODIMENTS

Figure 1:
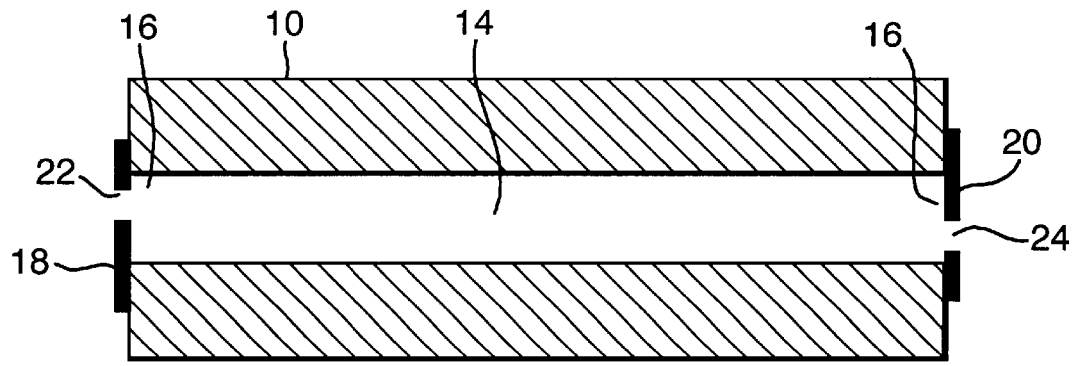
FIG. 1 is a diagrammatic cross-section of two aerospace components to be joined by a method in accordance with the invention.

Referring to FIG. 1, first and second aerospace components 10,12 respectively are positioned adjacent each other so as to define a space 14 between them. Preferably, the two components are held in place by a construction jig (not shown). Edges 16 of the space 14 are bridged by means of sealing webs 18,20. The sealing webs are preferably self adhesive on one side so as to adhere to the edges of the first and second components 10,12. The web 18 has an outlet 22 formed therein through which suction can be applied to the space 14 whilst the web 20 has an inlet 24 formed therein through which adhesive can flow.

Figure 2:
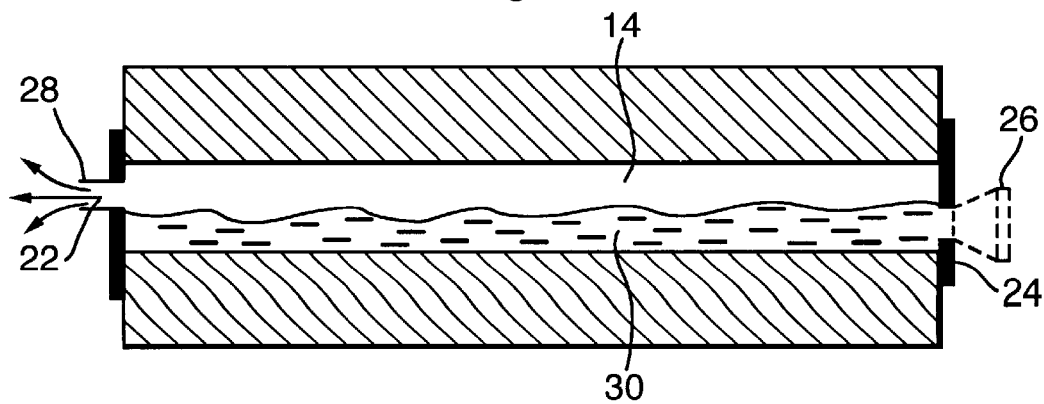
FIG. 2 shows the components of FIG. 1 during the filling of the space with resin adhesive by suction.

Looking at FIG. 2 a nozzle 26 connected to a resin adhesive source (not shown) is positioned sealingly in the inlet 24. A nozzle 28 to which suction can be applied is positioned sealingly in the outlet 22. The suction applied to the nozzle 28, draws resin 30 through the nozzle 26 and into the space 14 until the space 14 has been filled with resin as shown in FIG. 3.

Figure 3:
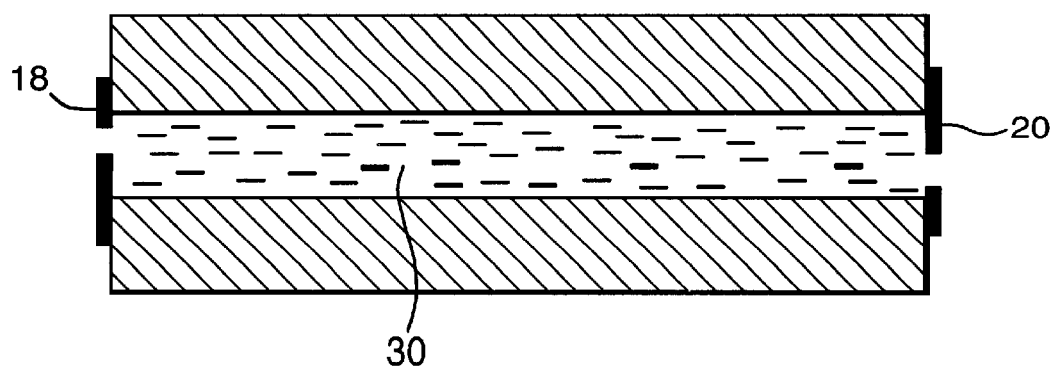
FIG. 3 shows the components of FIG. 1 after the filling of the space with resin adhesive by suction.

After the FIG. 3 stage has been reached, the resin 30 is allowed to set or is suitably cured. The webs 18,20 are constructed from a fabric tape made, for example, from glass or carbon fibres.

It will be noticed that the introduction of the resin adhesive by suction and the use of the webs 20,22 enables a joint to be formed in a simple and effective manner without loss of the resin 30 at the edges.

It is preferable during the process to have the inlet 24 at a lower level relative to the outlet 22. That arrangement will help to ensure that the resin 30 enters the space 14 at a steady rate and minimises the chances of voids or porosity forming within the joint. Also the webs 18,20 control the profile of the resin 30 at the edges. In either case an effective and reliable bond is achieved.

Figure 4:
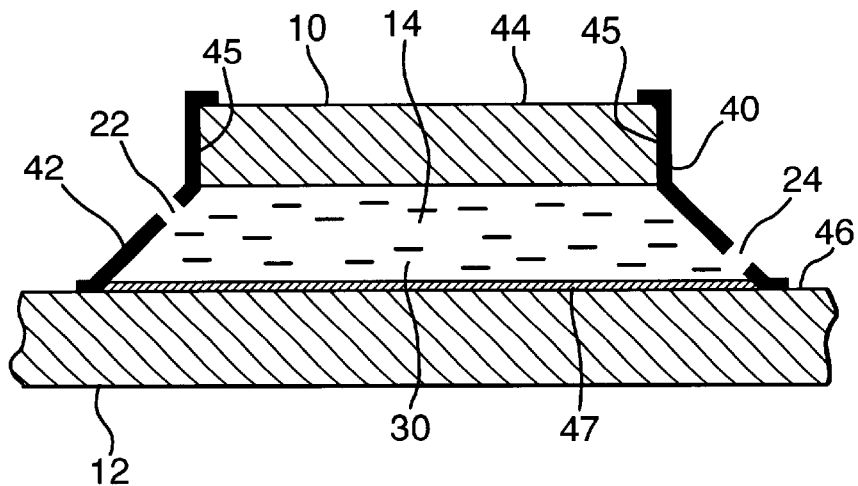
FIG. 4 is a diagrammatic cross-section of two alternative aerospace components to be joined by a method in accordance with the invention.

Looking next a FIG. 4, parts corresponding to parts shown in FIGS. 1 to 3 carry the same reference numerals. The component 12 extends beyond the edges of the component 10, and the space 14 between the components 10,12 is bridged by attaching webs 40,42 to an upper surface 44 and to the edges 45 of the component 10 and to an upper surface 46 of the component 12 as viewed in FIG. 4. The webs 40,42 are constructed in the same way as webs 18,20 described above.

Once the components 10,12 and the webs 40, 42 are positioned as shown in FIG. 4, a nozzle 26 is positioned in the inlet 24, a nozzle 28 is positioned in the outlet 28 and resin 30 is drawn into the space 14 as in FIGS. 2 and 3. It will be noted that the webs 40, 42 control the profile of the resin 30 at the edges. Again, as in FIGS. 1 to 3, the components 10, 12 can be held in position relative to each other by means of a construction jig. In this example a layer 47 of a release substance has been applied to the upper surface 46 of the component 12. This allows separation of the components 10, 12 after the joint has been formed. The release layer 47 may comprise a sealant material. If desired the two components 10, 12 can also be bolted together or otherwise mechanically joined together.

Figure 5:
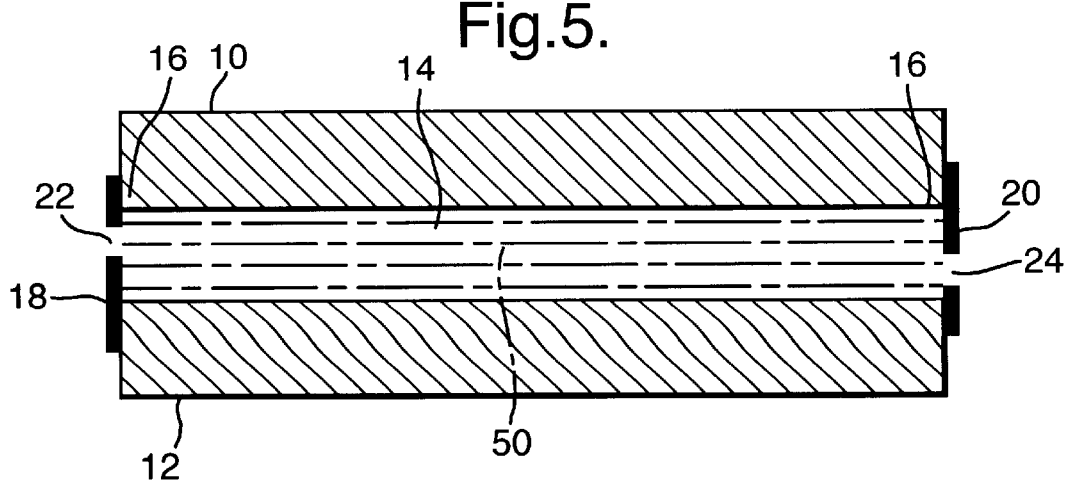
FIG. 5 shows the components of FIG. 1, with a fabric in the space between them, to be joined in a method in accordance with the invention.

Referring now to FIG. 5, parts corresponding to parts shown in FIGS. 1 to 4 carry the same reference numerals. First and second aerospace components 10,12 respectfully are positioned adjacent each other so as to define a space 14. Fabric 50 is then placed in the space 14 and edges 16 of the space 14 are bridged by means of sealing webs 18, 20. The sealing webs 18, 20 are again self-adhesive on one side. The resin is drawn into the space 14 in the manner described above so as to impregnate the fabric 50. Again, as in FIGS. 1 to 3, the components 10,12 can be held in position relative to each other by means of a construction jig.

In the present example, the fabric 50 comprises a lay-up of fibres such that the fibres of one layer are transverse to fibres of another layer. For example, the fabric may comprise a ±45 degree lay-up.

The use of the fabric 50 in the space 14 produces a number of benefits. Firstly, the glue-line now easily ranges from 0.2–3.0 mm hence allowing much larger spaces to be filled than using present known methods. That also allows components to be constructed to lower tolerances which in turn saves on costs. Secondly, the fabrics may provide separation of surface parts of large components which might otherwise touch each other, thus reducing the chances of those surface parts remaining unwetted by the resin 30. Thirdly, the fabric 50 helps to control the coefficient of thermal expansion (CTE) across the joint. By having the CTE of the combined resin 30 and fabric 50 similar to that of the components 10,12 the thermal stress experienced throughout the overall joint is reduced. Finally, the fabric 50 within the joint increases the shear and peel strength. For glue lines greater than 1 mm in thickness a shear strength of approximately 25 MPa or more is possible.

Figure 6:
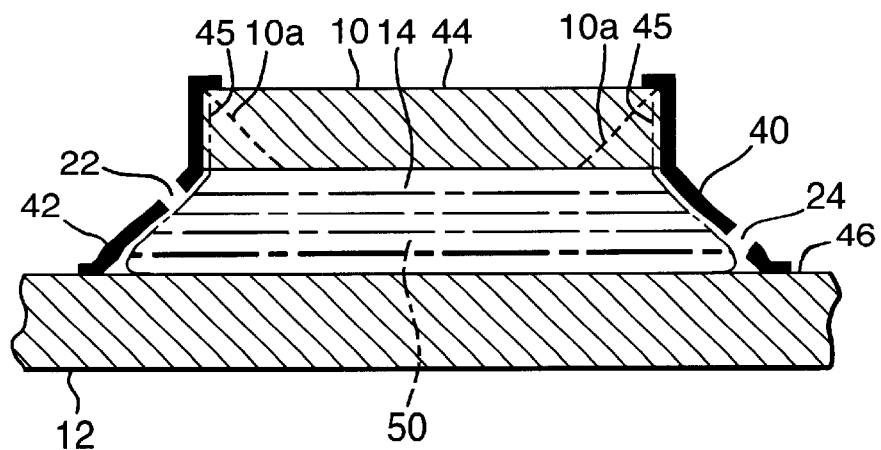
FIG. 6 shows the components of FIG. 4, with a fabric in the space between them, to be joined in a method in accordance with the invention.

Looking now at FIG. 6, arrangement is similar to that shown in FIG. 4 except, in this case, fabric 50 is placed in the space 14, and a layer 51 of the fabric 50 is folded back across each edge of the fabric 50. If desired the component 10 may have its edges chamfered as shown in broken lines at 10a. In that case the layers 51 may extend into the chamfers 10a.

As in FIG. 4, the web 42 has an outlet 22 formed therein and the web 40 has an inlet 24 formed therein and resin 30 is drawn into the space 14 as described with respect to FIG. 4 where the chamfers 10a are formed, the adhesive flows into the space 14, and into the space defined by the chamfers. Again, as in FIG. 4 the components 10, 12 can be held in position relative to each other by means of a construction jig. The folding over of the layer 51 provides a smooth edge to the adhesive-filled space 14.

If desired, a release layer 47 may be used in the embodiments of FIGS. 5 and 6.

Figure 7:
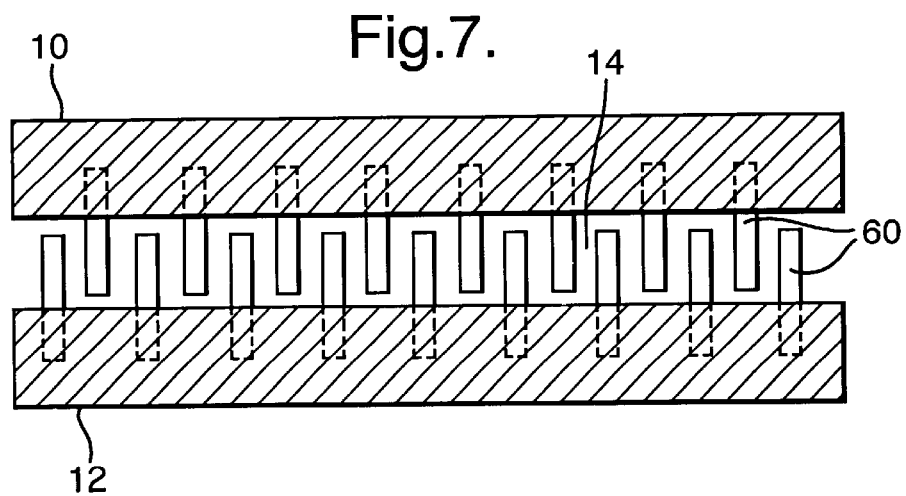
FIG. 7 is a diagrammatic cross-section of two components with projections thereon to be joined in a method in accordance with the invention.

Looking next at FIG. 7, parts corresponding to parts shown in FIGS. 1 to 3 carry the same reference numerals.

The first and second components 10,12 respectively in FIG. 7 have projections 60 thereon. The components 10,12 are positioned adjacent each other so as to define a space 14 between them with the projections 60 extending into the space 14 such that the projections on the first component 10 interdigitate with the projections on the second component 12. The two components 10, 12 are then joined using the method as described in FIGS. 1 to 3 during which the resin 30 surrounds the projections 60, the sealing webs 18, 20 are provided but not being shown in FIG. 7.

Figure 8:
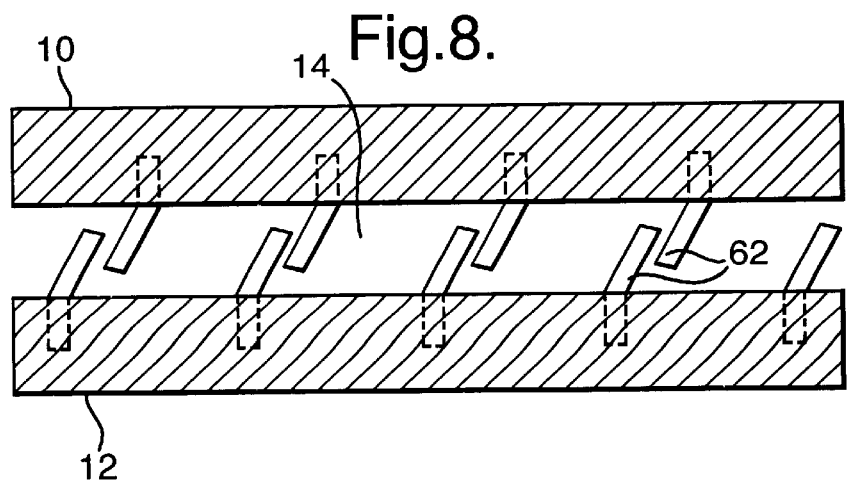
FIG. 8 is a diagrammatic cross-section of two components with alternative projections thereon to be joined in a method in accordance with the invention.

In the present example the projections 60 are substantially straight, however, as shown in FIG. 8 the projections 62 may be inclined.

The projections are preferably used where the glue-line exceeds 0.5 mm and are typically 1–3 mm in length. The projections provide an increase in shear strength to the joint.

Figure 9:
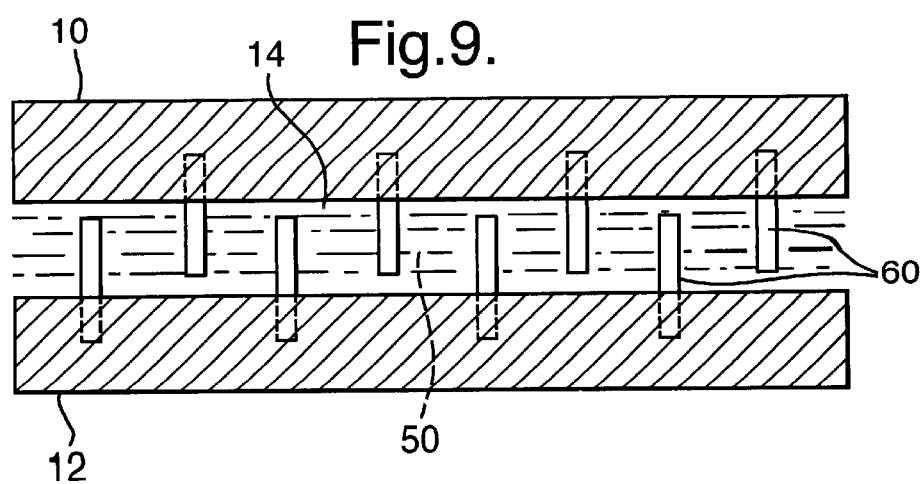
FIG. 9 shows the components of FIG. 7, with a fabric in the space between them, to be joined in a method in accordance with the invention.

Referring finally to FIG. 9, first and second aerospace components 10, 12 with projections 60 thereon are positioned adjacent each other so as to define a space 14 between them with the projections 60 extending into the space 14 such that the projections interdigitate. A fabric 50 is placed in the space 14 and the two components are joined according to the method as described in FIGS. 1 to 3.

The joint formed in FIG. 9 is of increased strength having both the benefits of the projections 60 and the fabric 50.

The joint formed by the method of the present invention may be rib-skin joints, stringer joints, skin-spar joints, hybrid joints and joints involving shimming.

Whilst specific reference has been made to the use of a resin adhesive 30, a sealant or a filler may be used where it is simply required to seal or fill the space 14. Where a sealant or filler is used it may be desirable to fasten the components together mechanically, e.g. by means of bolts, rivets or other fasteners The adhesive or sealant used is preferably based on a resin having a viscosity of <200 cPs for several hours at a processing temperature of ambient to 100° C.

Resin systems which gel at "low" temperatures, typically about 80° C., are preferred to minimise the jigging requirements. Possible free standing, post cure, may be employed.

What is claimed is:

1. A method of producing a joint between components, the method comprising the steps of:

positioning two components adjacent each other so as to define a space between them;

placing a fabric in said space;

bridging edges of said space by a sealing member; and filling the space with a flowable material.

2. A method according to claim 1 in which the fabric occupies substantially 2–70% of the space.

3. A method according to claim 2 in which the fabric occupies substantially 30–60% of the space.

4. A method according to claim 1 in which the fabric comprises a lay-up of fibres wherein fibres of one layer are transverse to fibres of another layer.

5. A method according to claim 4 in which the fabric has a +/–45 degree lay-up.

6. A method according to claim 1 in which the sealing member is in the form of a web.

7. A method according to claim 6 in which the web is formed from a flexible material.

8. A method according to claim 6 in which the web is self adhesive on one side to retain it in place.

9. A method according to claim 1 in which the sealing member is formed from fabric tape.

10. A method according to claim 9 in which the fabric tape is constructed of glass fibres.

11. A method according to claim 9 in which the fabric tape is constructed of carbon fibres.

12. A method according to claim 1 including laying the sealing member against the components and painting over it with one of a sealant, adhesive and varnish to hold the sealing member in place.

13. A method according to claim 1 including bridging edges of the space by attaching the sealing member to surface portions of the components.

14. A method according to claim 1 including applying a release layer to a component of the joint to facilitate separation of the joint components.

15. A method according to claim 1 including mounting the components in a construction jig so as to define the space between them.

16. A method according to claim 1 in which at least one of the components has discrete projections thereon and the method comprises positioning the components adjacent each other so as to define a space between them with the projections extending into the space, the flowable material surrounding the projections as it is introduced into the space.

17. A method according to claim 16 in which projections are provided on both components.

18. A method according to claim 17, in which the projections on one component interdigitate with the projections on the other component.

19. A method according to claim 1 in which the flowable material is comprised of one of a paste-like adhesive, a resin, a sealant and a filler.

20. A joint produced by a method according to claim 1.

21. An aircraft having a joint therein produced by a method according to claim 1.

* * * * *